United States Patent
Mayr

[11] Patent Number: 5,664,901
[45] Date of Patent: Sep. 9, 1997

[54] EXPANSION DOWEL

[75] Inventor: Franz-Paul Mayr, Hechenwang, Germany

[73] Assignee: Hilti Aktiengesellschaft, Fürstentum, Liechtenstein

[21] Appl. No.: 626,819

[22] Filed: Apr. 3, 1996

[30] Foreign Application Priority Data

Apr. 3, 1995 [DE] Germany ................. 195 12 415.4

[51] Int. Cl.$^6$ ................................................. F16B 2/04
[52] U.S. Cl. ..................... 403/297; 403/282; 411/55; 411/60; 411/181
[58] Field of Search .................... 403/297, 292, 403/309, 310, 313, 282, 279, 371; 411/55, 60, 61, 180, 181

[56] References Cited

U.S. PATENT DOCUMENTS

| | | | |
|---|---|---|---|
| 2,308,592 | 1/1943 | Raybould | 403/294 |
| 4,259,890 | 4/1981 | Walsh | 411/55 X |
| 4,752,168 | 6/1988 | Richter | 411/55 X |
| 5,116,176 | 5/1992 | Yousuke | 411/60 |

FOREIGN PATENT DOCUMENTS

| | | | |
|---|---|---|---|
| 0008085 | 2/1980 | European Pat. Off. . | |
| 325234 | 10/1902 | France . | |
| 879842 | 12/1942 | France | 403/297 |
| 2415225 | 9/1979 | France | 403/297 |
| 841949 | 7/1949 | Germany . | |
| 3907593 | 9/1990 | Germany | 411/55 |
| 2041136 | 9/1980 | United Kingdom | 411/180 |
| 8606880 | 11/1986 | WIPO . | |

*Primary Examiner*—Harry C. Kim
*Attorney, Agent, or Firm*—Anderson Kill & Olick, P.C.

[57] ABSTRACT

An expansion dowel (1) is formed of an axially extending dowel member (2) having a leading end and a trailing end. The trailing end has an outwardly projecting collar (9) with an expansion region extending axially from the trailing end toward the leading end with at least one axially extending slot (7) or breakout groove therein. The dowel member (2) has a central throughbore (3) arranged to receive an expanding element (8). Throughbore (3) has an inside thread (15) in its leading end region. The expanding element (8) is an axially extending sleeve insertable into the trailing end of the throughbore (3) for expanding the expansion region (6).

5 Claims, 1 Drawing Sheet

EXPANSION DOWEL

BACKGROUND OF THE INVENTION

The present invention is directed to an expansion dowel comprising an axially elongated cylindrically-shaped dowel member having a collar and an expansion region containing at least one of an axial slot or a breakout groove. The dowel member has an approximately central throughbore shaped to receive an expanding element.

Expansion dowels of the generic type are in very wide use. They are utilized in rock, concrete, masonry and similar receiving materials. Moreover, they are also used in lower strength receiving materials, such as wood. The collar at the trailing end of the expansion dowel affords a precise setting depth independently of the borehole depth. Sheet metal plate is often used in forming an expansion dowel, since it is inexpensive and easy to form. An expansion dowel is disclosed in DE-C-841 949 comprising a cylindrically shaped dowel member with a collar. The dowel member has a throughbore and is slotted along an axially extending side. This expansion dowel is intended to be expanded, without an additional expansion element, for fixing a lug or gudgeon, for instance the gudgeon of a door handle, in a reliable manner without using screws, bolts or rivets. The dowel has an expanding member at its leading end insertable into a cross sectional constriction in the throughbore, and the constriction is widened when a peg or gudgeon is driven into the throughbore and presses the leading end of the dowel member into the borehole wall. The peg for the door handle, driven into the throughbore, functions as an expanding element. As a result, the expansion dowel is self-locking, whereby driving the peg is possible, however, extracting the expansion dowel is prevented. While this type of anchoring an expansion dowel in very soft receiving material may lead to adequate retaining values, for instance for door handles and the like, the expansion dowel is not suitable for use in stronger receiving materials. In stronger receiving materials, such as rock, concrete and masonry, the leading edge is pressed only slightly or not at all into the surface of the borehole. Rather, the region of the cross sectional constriction is simply urged outwardly and is plastically deformed. It is impossible to obtain adequate retaining values in this manner. In receiving materials of lower strength, however, it is also impossible to provide anchorages for this type of expansion dowel which satisfy higher retaining value requirements.

Therefore, it is desirable to provide an expansion dowel which can be fabricated from sheet metal plate and which is suitable for use in receiving materials of lower strength, and can also be used in strong, solid receiving materials, such as rock, concrete, masonry and the like. The expansion dowel should provide adequate retaining values in the broad range of receiving materials. Further, the expansion dowel is to be used for direct attachment of elements without using screws, bolts as well as permitting conventional attachments like screw members. No additional setting tools are to be needed for expanding such dowels.

SUMMARY OF THE INVENTION

Therefore, it is a primary object of the present invention to provide an expansion dowel which affords the above requirements. In accordance with the invention, an expansion dowel is provided having an axially extending cylindrically shaped dowel member with a collar and an expansion region containing at least one of an axially extending slot or a breakout groove. The dowel member has an approximately central throughbore shaped to receive an expanding element. An inside thread is provided in the leading end region of the throughbore. The expanding element is in the form of a sleeve and is insertable into the trailing end region of the throughbore and such trailing end region forms the expansion region of the dowel member.

Such an expansion dowel can be used universally due to its inventive features.

The expansion region equipped with a slot or breakout groove is disposed in the trailing end region of the dowel member. The expansion element can be driven in this region into the central bore and is in the form of sleeve. No special setting tool is needed for driving sleeve into the borehole, it can be driven by a hammer. In this arrangement, a flush expansion of the expansion dowel independent of the borehole is assured by the collar located at the trailing end dowel member. The expanding action is achieved by the pressure developed in the trailing end region of the dowel member, forming the expansion region in the borehole. The leading end region in the borehole is provided with an inside thread. Journals or lugs can be driven directly into the sleeve, and, for instance, door handles can be attached in this manner. The presence of an inside thread in the leading end region of the throughbore affords the possibility of a bolt or screw connections. The length of the screw is determined only by the dimension of the item to be attached and the depth of the borehole. In a preferred embodiment of the expansion dowel of the present invention, the expansion region of the dowel member extends approximately for ½ to ¾ of the axial length of the expansion member. As a result, a sufficiently long expansion region is afforded which, together with a sleeve of adequate length as the expanding element, provides adequate retaining values in all types of receiving materials.

Preferably, the axial length of the sleeve is selected so that in the inserted state it does not project outwardly from the trailing end of the throughbore. In such an arrangement, the sleeve terminates flush with the collar on the trailing end of the dowel member. Accordingly, elements to be anchored fit flush with the dowel member.

In a preferred embodiment of the invention, the leading end region of the throughbore, containing the inside thread, has a smaller diameter than the trailing end region. In the case of a direct fastening of a peg or pin in the sleeve, it abuts, if it is driven forwardly into the dowel member together, with the peg at the end of the leading end region spaced from the leading end of the expansion dowel.

Accordingly, only the peg or pin is advanced if the forward driving action is continued. It is advantageous if the expanded sleeve has an inside diameter greater than or equal to the diameter of the leading end region of the throughbore. In this way it is assured that the inside thread in the leading end region of the throughbore is accessible for inserting a screw. The dowel member of the present invention can be formed of plastics material or metal. Preferably, the dowel member an the expansion sleeves are fabricated from sheet metal plate which is easy to fabricate.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
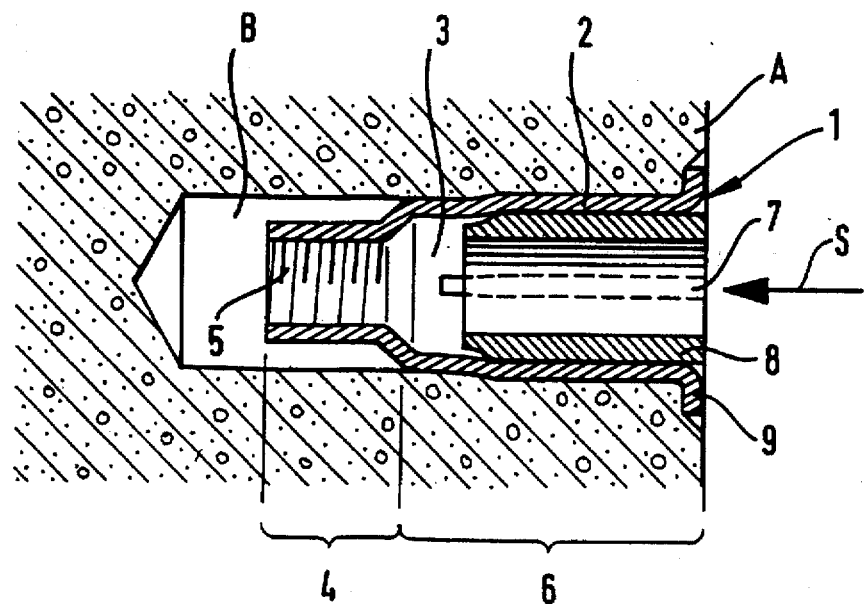
FIGS. 1 is an axially extending view of an expansion dowel embodying the present invention and illustrated in the expanded condition within a borehole in a receiving material.
Figure 2:
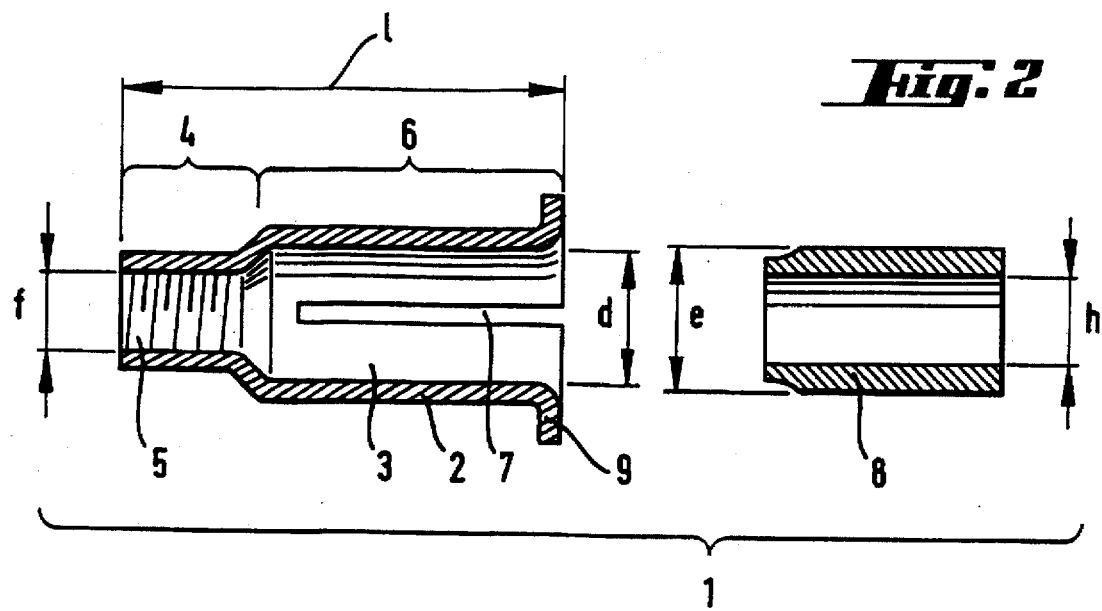
FIG. 2 is an axially extending sectional view of the expansion dowel shown in FIG. 1 and displayed in an exploded manner.

In FIGS. 1 and 2 an expansion dowel 1 is illustrated. The expansion dowel 1 comprises an axially extending cylindrically-shaped dowel member 2 with an axially extending central throughbore 3. As viewed in the drawing, dowel member 2 has a leading end at the left hand end and a trailing end in the right hand end and is insertable into a borehole B in the setting direction S, note the arrow shown in FIG. 1.

Dowel member 2 has a leading end region 4 extending from its leading end toward its trailing end and a trailing end region 6 extending from the trailing end to the rear end of the leading end region. The trailing end region 6 of the dowel member forms the expansion region and has at least one axially extending slot 7. A breakout groove can be provided in place of the slot 7. A collar 9 is formed on the trailing end of the dowel member extending radially outwardly from the outside surface of the dowel member and the collar serves as a stop when setting the expansion dowel into the borehole B in a receiving material A, such as concrete.

The central throughbore 3 is arranged in the trailing end region 6 of the dowel for receiving an expanding element in the form of an axially extending sleeve 8. As shown in FIG. 2, the outside diameter of the sleeve is approximately 0.5 mm to 1.5 mm, plus or minus 0.2 mm manufacturing tolerance, larger than the inside diameter d of the trailing end region 6 of the dowel member which forms the expansion region. The expansion region or trailing end region 6 extends for approximately ½ to ¾ of the overall axial length 1 of the dowel member 2. When the sleeve 8 is driven in the setting direction S into the central throughbore 3 it widens the expansion region 6 which widening is effected due to the axially extending slot 7. The axial length of the sleeve is selected so that when it is driven into its final position its trailing end is located flush with the collar 9 of the dowel member 2.

The leading end region for throughbore 3 has a smaller inside diameter f than the inside diameter d of the trailing end region 6 and has an axially extending inside thread 5 forming an engagement means for an attachment screw, not shown. The inside diameter h of the sleeve 8 is greater than or at the least equal to the inside diameter f of the leading end region in the throughbore 3.

In the embodiment illustrated, the outside surfaces of the dowel member 2 and the sleeve 8 taper inwardly toward the leading ends. It should be noted that the embodiment illustrated is only by way of example and not limitation. It is possible that the dowel member 2 and the sleeve 8 can have outside cylindrical shapes of a constant diameter for their full axial length.

The expansion dowel 1 of the present invention can be fabricated from plastics or metal. Preferably, the dowel member 2 and the sleeve 8 are fabricated from sheet metal plate which is easy to form.

The expansion dowel of the present invention can be used in all types of receiving materials. The expansion region 6 has a slot 7 or a breakout groove located in the trailing end region of the dowel member. The expansion element, to be driven into the central throughbore in the expansion region, is in the form of a sleeve. Driving the sleeve into the dowel member does not require a special setting tool, a hammer is all that is required for driving the sleeve into its position within the dowel. A flush expansion is assured, independent of the borehole depth, due to the collar 9 provided at the trailing end of the dowel member.

The expansion is achieved within the throughbore by the pressure applied in the trailing end region of the dowel member which forms the expansion region. The dowel member has an inside thread 5 in its leading end region. Pegs or pins can be driven directly into the sleeve and door handles can be attached in this way. The inside thread 5 in the leading end region of the throughbore 3 affords engagement means for threaded attachments. The length of a screw for a threaded attachment is determined solely by the thickness of the element to be attached and the depth of the borehole.

While specific embodiments of the invention have been Shown and described in detail to illustrate the inventive principles, it will be understood that the invention may be embodied otherwise without departing from such principles.

What is claimed is:

1. An expansion dowel comprising an axially extending cylindrically shaped dowel member (2) having a leading end to be inserted first into a borehole, a trailing end and an axially-extending outside surface, a collar (9) formed on the trailing end of said dowel member (2) and projecting transversely of the axial direction and radially outwardly from said outside surface, said dowel member having an expansion region (6) extending axially from said trailing end toward and short of said leading end with an axially extending slot (7) therein, said expansion region having an inside diameter (d) said dowel member (2) having a central throughbore (3) between said leading and trailing ends for receiving an expanding element (8), said throughbore having an inside thread (5) in an axially extending leading end region, said expanding element comprises an axially extending sleeve (8) insertable into the expansion region (6) of said throughbore (3) through said trailing end of said dowel member (2), and said sleeve (8) having an outside diameter (e) greater than the inside diameter (d) of said expansion region, so that said expansion region is expanded when said sleeve is inserted thereon.

2. An expansion dowel, as set forth in claim 1, wherein said expansion region (6) extends axially in the range of ½ to ¾ of the overall axial length (1) of said dowel member (2).

3. An expansion dowel, as set forth in claim 1 or 2, wherein said sleeve has an axial length such that in the inserted state in said dowel member (2) it is located within said throughbore (3) and does not extend rearwardly out of said trailing end expansion region (6).

4. An expansion dowel, as set forth in claim 3, wherein said axially extending leading end region (4) of said throughbore (3) has said axially extending inside thread (5) and has a smaller diameter (f) than the inside diameter (d) of the trailing end region (6), and said sleeve (8) has an inside diameter (h) equal to or greater than said, diameter (f) of the leading end region (4) of said throughbore (3).

5. An expansion dowel, as set forth in claim 3, wherein said dowel member (2) and said expansion sleeve (8) are formed of metal.

* * * * *